Patented Aug. 3, 1926.

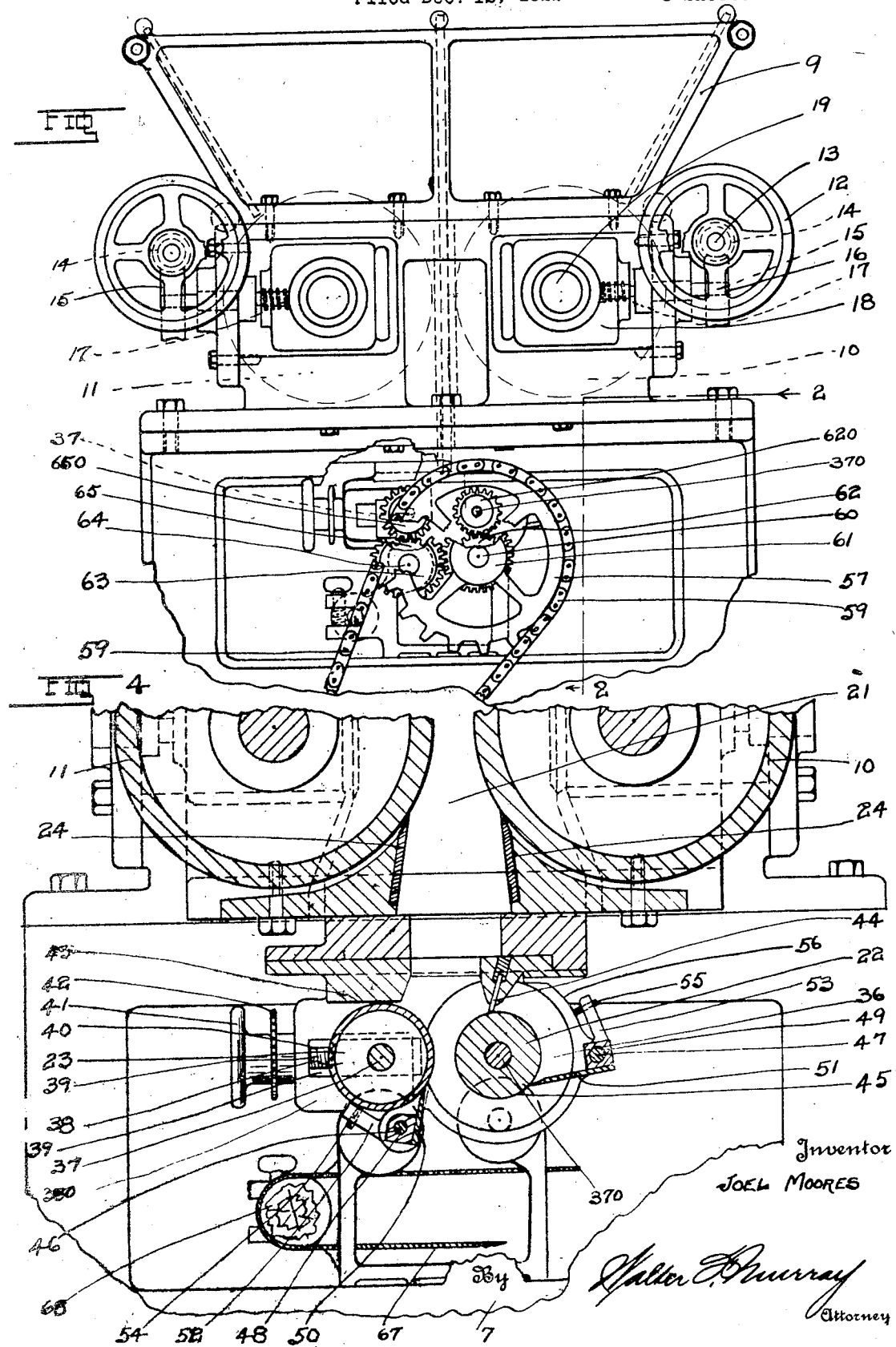

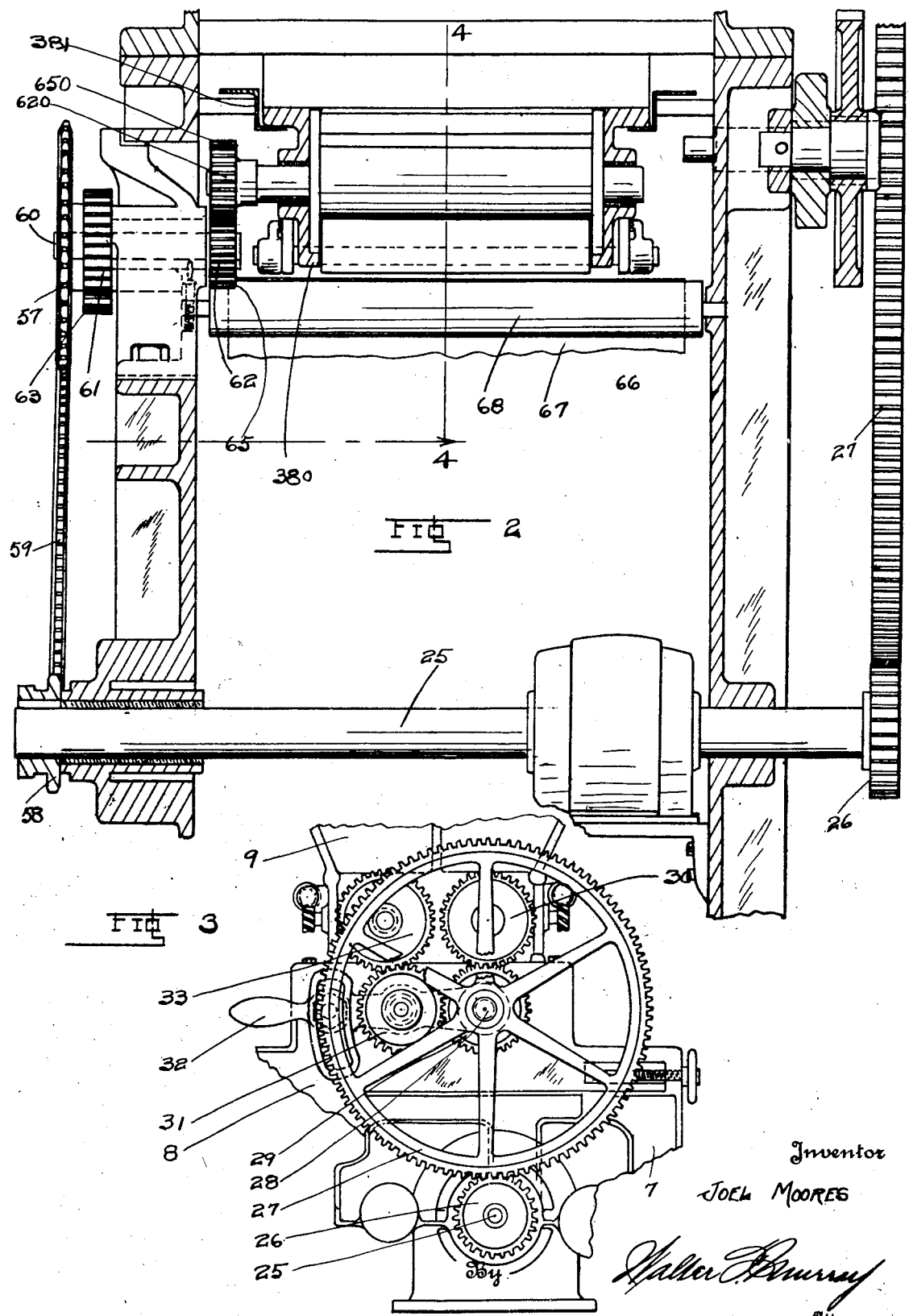

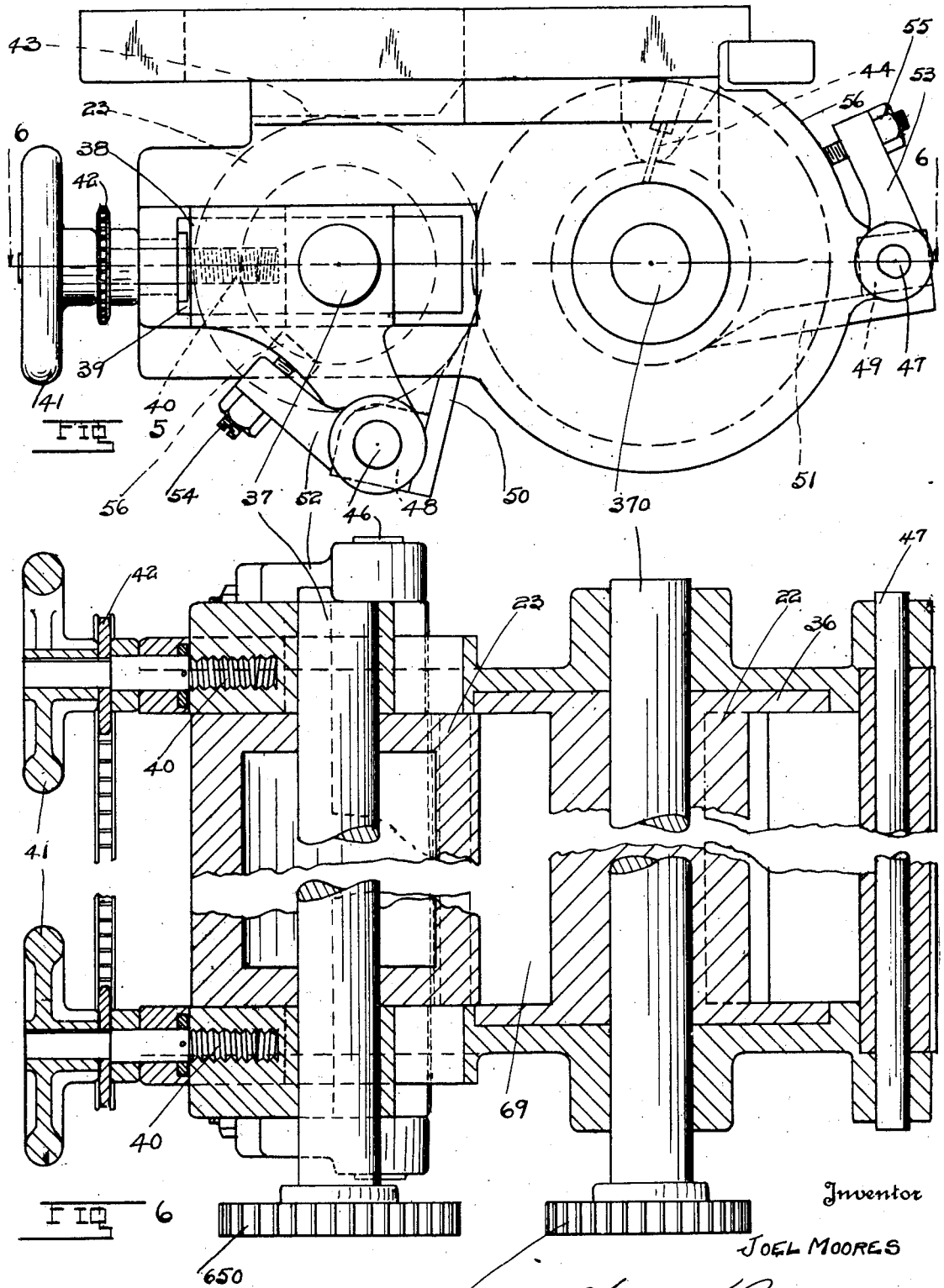

1,595,019

UNITED STATES PATENT OFFICE.

JOEL MOORES, OF CINCINNATI, OHIO, ASSIGNOR TO THE J. H. DAY COMPANY, OF CINCINNATI, OHIO, A CORPORATION OF OHIO.

MACHINE FOR ROLLING DOUGH.

Application filed December 12, 1922. Serial No. 606,450.

An object of my invention is to provide a simple and efficient device for producing bands or sheets of dough preparatory to cutting cake and cracker blanks from the dough.

Another object of my invention is to eliminate the defects of prior devices of this kind, wherein the side edges of the sheets of dough were uneven and ragged.

Another object of my invention is to provide a device wherein the operation of the several parts is positive.

These and other objects are attained by means described herein and disclosed in the accompanying drawings, in which:

Fig. 1 is a fragmental side elevation of a device embodying my invention.

Fig. 2 is an enlarged sectional view on line 2—2 of Fig. 1.

Fig. 3 is a fragmental side elevation of the device shown in Fig. 1, showing the opposite side thereof.

Fig. 4 is an enlarged sectional view on line 4—4 of Fig. 2.

Fig. 5 is an enlarged fragmental view of parts shown in Fig. 4.

Fig. 6 is a fragmental sectional view on line 6—6 of Fig. 5.

The base 7 supports a suitable housing 8 carrying at its top a hopper 9 for receiving dough. Rollers 10 and 11 carried by the housing and adjustable horizontally by any suitable means, form the bottom of the hopper. The rollers may be adjusted toward and away from one another by means of hand wheels 12, shafts 13, worms 14 mounted on shafts 13, worm wheels 15 carried by shafts 16, the shafts 16 having formed on them a screw 17 engaging in a threaded way in the bearing blocks 18 slidably mounted upon the housing and carrying the shafts 19. The shafts 19 support the rollers 10 and 11. The rollers 10 and 11 feed dough from the hopper to the chamber or way 21 extending downwardly between the rollers 10 and 11. The pressure on the dough in chamber 21 causes the dough to pass to a pair of rollers 22 and 23. The housing carries suitable scrapers or knives 24 that engage the rollers 10 and 11 and assure separation of the dough from the rollers 10 and 11 as the rollers leave the chamber 21. Motion may be imparted to the rollers 10 and 11 from a drive shaft 25 by means of a gear 26 engaging a gear 27 mounted on a shaft 28, and on which shaft 28 is mounted a gear 29 engaging a gear 30 mounted on one of the shafts 19, and an idler gear 31 revolubly mounted on an adjustable lever 32, adapted to engage a gear 33 mounted on the second shaft 19. In the practical application of the device embodying my invention the shaft 19 carrying the gear 33 is the only shaft that is adjusted to vary the distance between the rollers 10 and 11.

The roller 22 carries at its ends flanges 36 between which the roller 23 is adjustable toward and away from the roller 22. The roller 23 is adjusted horizontally by any suitable means such as by having the shaft 37 supporting said roller mounted on suitable bearing blocks 38 slidably contained in ways 39 formed in the die frame 380, and which blocks may be adjusted in said ways by any suitable means such as threaded screw 40 carrying suitable hand wheels 41 and sprockets 42. The roller 23 is adjustable in substantial parallelism with the face 43 formed on the housing, and which face is engaged by the roller, whereby to preclude escape of dough from the way 21. The housing also carries the plate 44 in immediate proximity to the upper surface of face 45 of the roller 22 whereby to preclude escape of dough from the way 21. Transverse shafts 46 and 47 carried by the housing in any suitable manner have pivotally mounted on them suitable brackets 48 and 49 carrying scraping blades 50 and 51 engaging the rollers 23 and 22 respectively. The brackets carry arms 52 and 53 in which are adjustably mounted screws 54 and 55 whereby the scrapers 50 and 51 may be adjusted in relation to the rollers in order to take up any wear of the scrapers. The screws 54 and 55 may engage a suitable surface such as 56 on the housing whereby to permit such adjustment. Motion may be imparted to the rollers 22 and 23 in any suitable manner such as by means of sprockets 57 and 58 and a chain 59. The sprocket 57 is mounted on a shaft 60 extending thru a wall of the housing and carrying at its opposite ends gears 61 and 62. The gear 61 engages a gear 63 carried by a second shaft 64 extending thru a wall of the housing and carrying at its inner end a gear 65. The gear 62, mounted on the inner end of shaft 60, engages a gear 620 on the shaft 370 of roller 22 and the gear 65 mounted on the inner end of shaft 64 meshes with a gear 650 on the roller shaft 37. The sprocket 58 may be mounted on the shaft 25. A belt 67 extending about a roller 68 is adapted to receive dough from the rollers 22 and 23 and to carry same therefrom.

The die comprising the rollers 22 and 23, and the frame 380, is supported on the housing by the Z rails 381 carried by the housing. This structure permits the easy removal of the die.

The operation of my device is as follows:

A mass of dough is placed in the hopper and is fed into the way 21 and to the rollers 22 and 23 by means of the upper pair of rollers 10 and 11. The dough, passes thru the way 21 and is operated upon by the lower pair of rollers 22 and 23, the last mentioned pair of rollers determining the thickness of the sheet. By reference to Fig. 6 it will be readily apparent that dough can leave the way 21 only by way of the opening 69 formed between the rollers 22 and 23, wherefore, the sheet of dough which is delivered thru the belt 67 is smooth and even, and the edges thereof are unfrayed. The flanges on the ends of roller 22 form smooth edges on the sheet of dough.

What I claim is:

1. In a device of the class described the combination of a hopper, a die controlling discharge from the hopper and comprising a pair of rollers, one of which is flanged at its ends and the other of which extends between the flanges and means for removably mounting the die beneath the hopper.

2. In a device of the class described the combination of a support housing, a hopper on the housing, feed rolls for receiving dough from the hopper, means carried by the housing for providing a way beneath the feed rollers, a roller die unit, and Z rails carried by the housing for supporting the roller die unit beneath said way.

3. In a device of the class described the combination of a supporting housing, a hopper on the housing, feed rollers for receiving dough from the hopper, scrapers for said rollers, the feed rollers and scrapers comprising side walls for a way through which dough may be forced and subjected to pressure, a roller die unit comprising a flanged frame, and means for removably supporting the frame beneath the way for permitting discharge of dough from the way through the roller die.

In testimony whereof, I have hereunto subscribed my name this 1st day of December, 1922.

JOEL MOORES.